E. C. S. PARKER.
PHOTOGRAPHIC APPARATUS.
APPLICATION FILED FEB. 12, 1920.

1,341,338. Patented May 25, 1920.

*Anamorphic*

T2017
X2002
X2011

F,G,H, are light-filters for different colors of light.

Inventor
Edward C. S. Parker
By his Attorney

UNITED STATES PATENT OFFICE.

EDWARD C. S. PARKER, OF THE UNITED STATES NAVY.

PHOTOGRAPHIC APPARATUS.

1,341,338. Specification of Letters Patent. Patented May 25, 1920.

Application filed February 12, 1920. Serial No. 358,103.

*To all whom it may concern:*

Be it known that I, EDWARD C. S. PARKER, of the United States Navy, a citizen of the United States, have invented a certain new and useful Improvement in Photographic Apparatus, of which the following is a specification.

In U. S. Letters Patent No. 1,328,291, granted to me January 20, 1920, I have set forth a method and apparatus for producing photographs and projecting the same in natural colors, and in U. S. Letters Patent Nos. 1,328,292, 1,328,293 and 1,328,294, also granted to me January 20, 1920, I have set forth photographic apparatus also embodying the aforesaid method—the said apparatus being, however, specifically different from the apparatus disclosed in my first-named Patent No. 1,328,291.

My present invention is another specifically different apparatus embodying said method, in which the construction is simplified and cheapened.

In the accompanying drawing—

Figure 1:
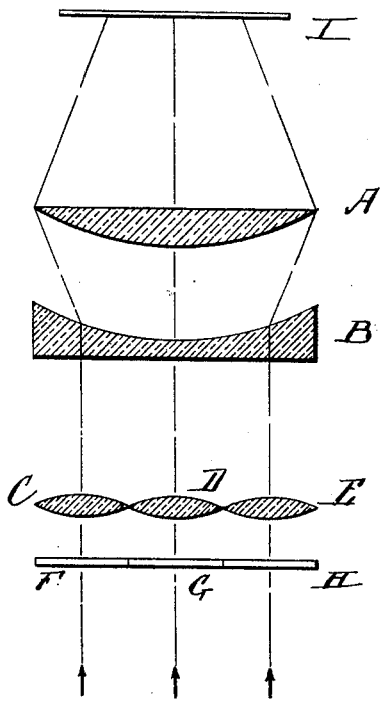
Figure 2:
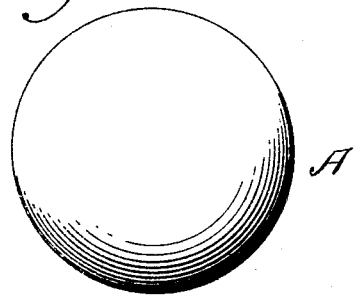
Figure 3:
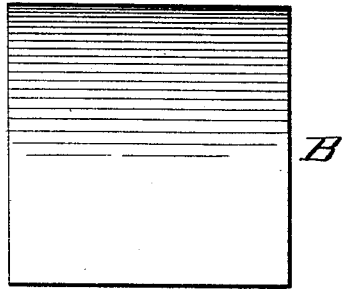
Figure 4:
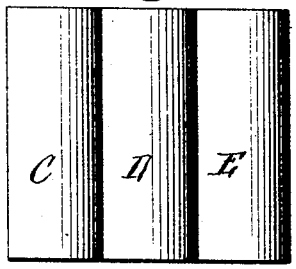

Figure 1 is an optical diagram, showing the lenses and color filters in section, and as disposed in the apparatus. Figs. 2, 3 and 4 are, respectively, plan views of the lenses A and B and of the group of lenses C, D, E.

Similar letters of reference indicate like parts.

A is a spherical convex lens (here plano convex). B is a cylindrical lens, here plano concave, the concavity being opposite to the convexity of lens A. C, D, E form a group of similar double convex cylindrical lenses disposed edge to edge with their longitudinal axes parallel to one another and to the longitudinal axis of lens B. Said lenses C, D, E are of shorter focal length than either lens A or B. F, G, H are light filters, each selective of a different color.

The light pencil coming from an object upon the lens A will be converged upon the lens B, and there diverged to traverse the lenses C, D, E which divide it into three pencils which then pass respectively through the color filters F, G, H. As fully set forth in my aforesaid patents, images thus produced upon a receiving surface—as a sensitized slide or film—will be reduced in width; or, in other words, the ratio of the dimensions of each image will be different from the ratio of the dimensions of the object. The filters will also act selectively to make the light traversing them free from the rays complementary in color to the color of the filters themselves. The images thus photographed upon the slide may then be projected by transmitting the light through the apparatus in the reverse direction; that is, assuming the rays traversing the several photographs on the film to pass in the direction of the arrows Fig. 1, they will successively traverse the filters F, G, H, lenses C, D, E, lens B and lens A, and finally be projected as a single picture on the screen I. The foci of the lens A and of the lenses C, D, E and the virtual focus of lens B should be in the same plane.

I claim:

A photographic apparatus of the type set forth, comprising in the order named, a convex spherical lens, a concave cylindrical lens, a plurality of convex cylindrical lenses of shorter focal length than either of said before-named lenses disposed edge to edge with their longitudinal axes parallel to one another and to the longitudinal axis of said concave lens, and color filters respectively transmitting the rays from said plurality of convex cylindrical lenses to the image-receiving surface.

In testimony whereof I have affixed my signature in presence of two witnesses.

EDWARD C. S. PARKER.

Witnesses:
 GERTRUDE T. PORTER.
 MAY T. MCGARRY.